(12) United States Patent
Takahashi et al.

(10) Patent No.: US 6,202,474 B1
(45) Date of Patent: Mar. 20, 2001

(54) ION CURRENT DETECTOR

(75) Inventors: Yasuhiro Takahashi; Koichi Okamura; Mituru Koiwa; Yutaka Ohashi, all of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/344,378

(22) Filed: Jun. 25, 1999

(30) Foreign Application Priority Data

Feb. 18, 1999 (JP) .................................................. 11-039989

(51) Int. Cl.[7] ..................................................... G01L 23/22
(52) U.S. Cl. ............................ 73/35.08; 73/116; 324/378
(58) Field of Search .................................. 73/35.08, 116; 324/378, 459, 464

(56) References Cited

U.S. PATENT DOCUMENTS

| 5,483,818 | * | 1/1996 | Brandt et al. ........................ 73/35.01 |
| 5,534,781 | | 7/1996 | Lee et al. ............................. 324/380 |
| 5,561,239 | * | 10/1996 | Yasuda ................................. 73/35.08 |
| 5,563,332 | * | 10/1996 | Yasuda ................................. 73/35.08 |
| 5,675,072 | | 10/1997 | Yasuda et al. ....................... 73/35.08 |
| 5,895,839 | * | 4/1999 | Takahashi et al. .................. 73/35.08 |
| 6,011,397 | * | 1/2000 | Yasuda ................................. 324/388 |
| 6,040,698 | * | 3/2000 | Takahashi et al. .................. 324/399 |

FOREIGN PATENT DOCUMENTS 61-057830    3/1986    (JP) .

* cited by examiner

Primary Examiner—Richard A. Moller
(74) Attorney, Agent, or Firm—Sughrue, Mion, Zinn, Macpeak & Seas, PLLC

(57) ABSTRACT

For a purpose of improving detecting performance toward knocking in small and middle intensity which must be detected as a top priority to conduct regulation of ignition timing, a device is provided to vary an output gain of an alternating component included in an ion current in accordance with ion current quantity. An ion current detector to detect the ion current to be generated surrounding an ignition plug just after mixed gas inside a cylinder has been ignited with a spark discharge having occurred at the ignition plug due to a voltage generated by an ignition coil, comprises a bias voltage generating part to generate a high voltage for an ion current detection to be applied to the ignition plug via the ignition coil, an ion current-to-voltage conversion part to convert an ion current having flowed between electrodes of the ignition plug by the high voltage into a voltage, and a knock signal generator to extract and amplify a frequency band resembling knocks on the basis of voltage conversion effect.

14 Claims, 5 Drawing Sheets

ION CURRENT DETECTOR

BACKGROUND OF THE INVENTION

1. Field of the Invention

The present invention relates to an ion current detector to detect the ionization of combustion gas generated by the combustion of an internal combustion engine as an ion current, and thus to detect a combustion status on the basis of the ion current.

2. Description of Related Art

An ignition-type internal combustion engine (hereinafter referred to as engine) compresses a mixed gas of air and fuel for introduction into a combustion chamber (hereinafter referred to as cylinder) by a piston and ignites and burns the compressed gas with an ignition plug to produce power. An output from an engine and ignition timing for a cylinder position share a close relationship. Generally, when the ignition timing is advanced, higher output is attainable. However, in the presence of an excess advance angle, an abnormal combustion condition called knocking takes place. In the case of repeated knocking, the engine can be destroyed.

When the mixed gas burns inside the cylinder, the burning gas is ionized. Therefore, when a voltage is applied to the burning gas, a current flows within the burning gas due to the ions' action. This current is called an ion current, and it varies according to the burning condition inside the cylinder. Accordingly, the burning condition can be determined by detecting the ion current.

The ion current sharply increases immediately after ignition, and reaches its peak in a short period of time, and thereafter gradually decreases. In the case where knocking occurs, an oscillating component of several kilohertz is superposed onto the ion current. It is indispensable to extract only the oscillating component caused by knocking from the sharply varying ion current. In Japanese Patent Laid-Open No. 7-63869, an ion current-to-voltage conversion part comprising an ion current detecting part to detect an ion current, and a diode, has been proposed. This ion current-to-voltage conversion part outputs a voltage in proportion to the ratio of an alternating component (oscillating component) included in the ion current which has been detected in the ion current detecting part by using logarithmic characteristics of a forward voltage of the diode.

BRIEF SUMMARY OF THE INVENTION

Object of the Invention

As described above, the voltage outputs of an ion current-to-voltage conversion part are set to present such characteristics as a voltage in proportion to the ratio of an alternating component included in the ion current which has been detected in the ion current detecting part by using the logarithmic characteristics of the forward voltage of the diode, then the oscillating component due to knocking is superposed onto the ion current in proportion to the ion current quantity. Thus extraction of the oscillating component from the ion current can be conducted.

However, only in the case of very large knocking is the oscillating component due to knocking superposed onto the ion current in proportion to the ion current quantity. It has been experimentally resolved that in the case of small to medium knocking, which must be detected as a top priority to conduct regulation of the ignition timing, the oscillating component due to knocking is not superposed onto the ion current in proportion to the ion current quantity, but the oscillating component is approximately the same size from the region with a large ion current quantity to the region with a small ion current quantity superposed onto the ion current.

Therefore, when the ion current-to-voltage conversion part is given characteristics to conduct a voltage conversion at a size in proportion to the ratio between the ion current quantity and the oscillating component to detect the oscillation component, it is difficult to detect the oscillating component in the region with a large ion current quantity unless the oscillation has a large amplitude. In addition, in the region with a small ion current quantity, even oscillation with a tiny amplitude is to be detected, even for a slight variation of the ion current. Thus, it will be detected as an oscillating component.

Therefore, when the ion current-to-voltage conversion part is given characteristics to detect the oscillating component in proportion to the ratio between the ion current quantity and the oscillating component, there was a problem in that the accuracy of the detection of the oscillating component for small to medium knocking, which must be detected as a top priority to regulate the ignition timing, got worse.

The present invention has been made to overcome such problems as described above, and its purpose is to obtain an ion current detector for an internal combustion engine which can improve the characteristics of detecting the oscillating component due to small to medium knocking.

SUMMARY OF THE INVENTION

An ion current detector in accordance with the invention, which detects an ion current generated around an ignition plug just after mixed gas inside a cylinder has been ignited with a spark discharge at the ignition plug due to a voltage generated by an ignition coil, comprises a voltage generating part to generate a high voltage for an ion current detection to be applied to the ignition plug via the ignition coil, an ion current-to-voltage conversion part to convert an ion current flowing between electrodes of the ignition plug by this high voltage into a voltage, which is output as an ion signal, and a signal processing part to conduct signal processing for the ion signals, wherein the ion current-to-voltage conversion part makes the voltage conversion ratio of the ion current smaller in the region with less ion current quantity.

The ion current-to-voltage conversion part of the ion current detector in accordance with the invention, further, makes the voltage conversion ratio of the ion current fixed when the ion current quantity is not less than a predetermined value.

The ion current-to-voltage conversion part of the ion current detector in accordance with the invention, also can make the voltage conversion ratio of the ion current decrease in proportion to the ion current quantity when the ion current quantity is not more than a predetermined value.

The ion current-to-voltage conversion part of the ion current detector in accordance with the invention also can make the voltage conversion ratio of the ion current decrease as the ion current quantity increases in the region with a large ion current quantity, and can further make the voltage conversion ratio of the ion current decrease as the ion current quantity diminishes in the region with a small ion current quantity.

The ion current-to-voltage conversion part of the ion current detector in accordance with the invention also can make the voltage conversion ratio of the ion current decrease as the ion current quantity increases in the region with an ion current quantity of not less than the first predetermined value, can make the voltage conversion ratio of the ion current decrease as the ion current quantity diminishes in the region with an ion current quantity of not more than a second predetermined value, and can make the voltage conversion ratio of the ion current fixed when the ion current quantity is not less than the second predetermined value and not more than the first predetermined value.

DETAILED DESCRIPTION OF THE PREFERRED EMBODIMENTS

Embodiment 1

Figure 1:
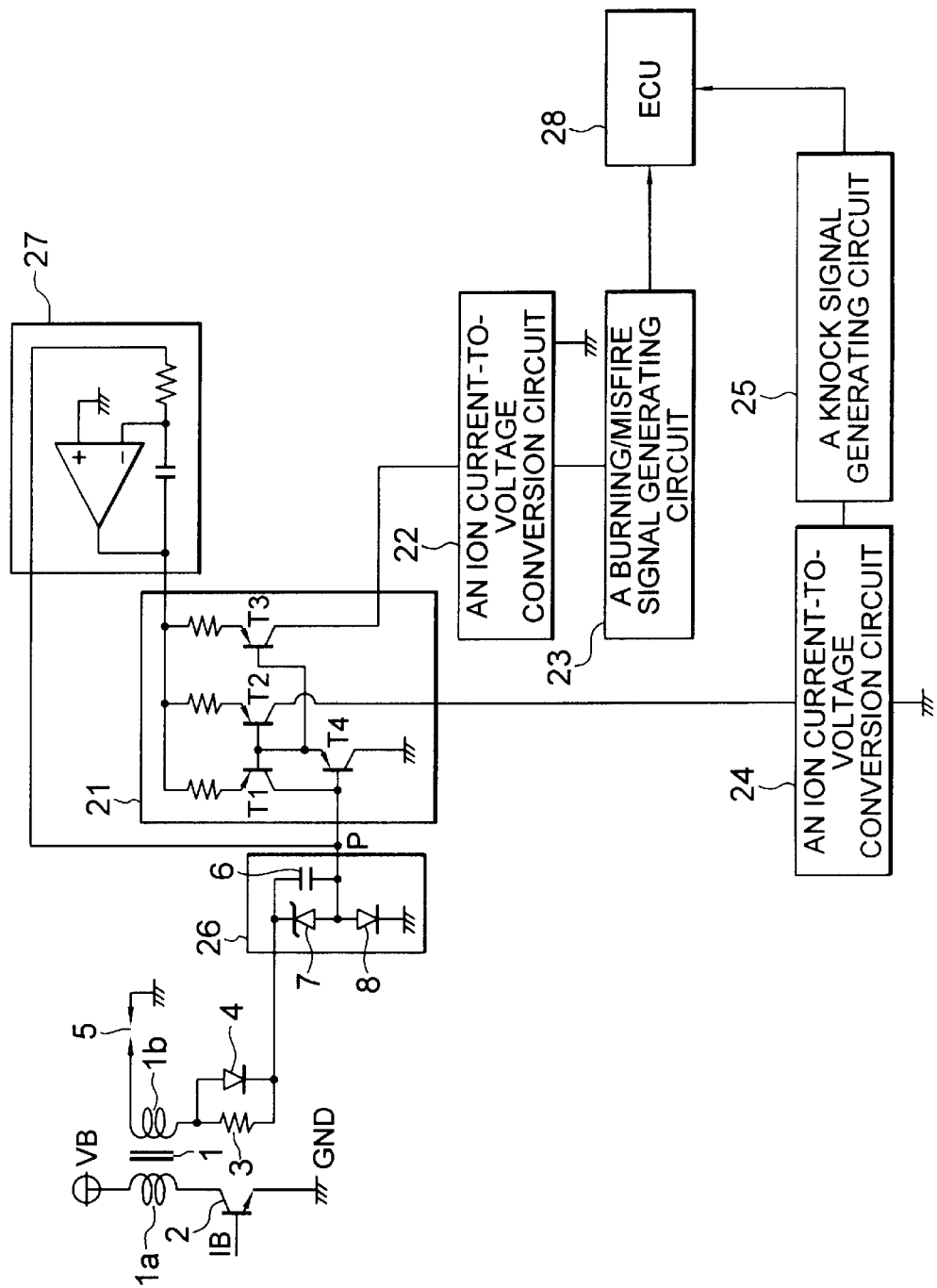
FIG. 1 is a block diagram of the ion current detector according to the present invention.
Figure 2:
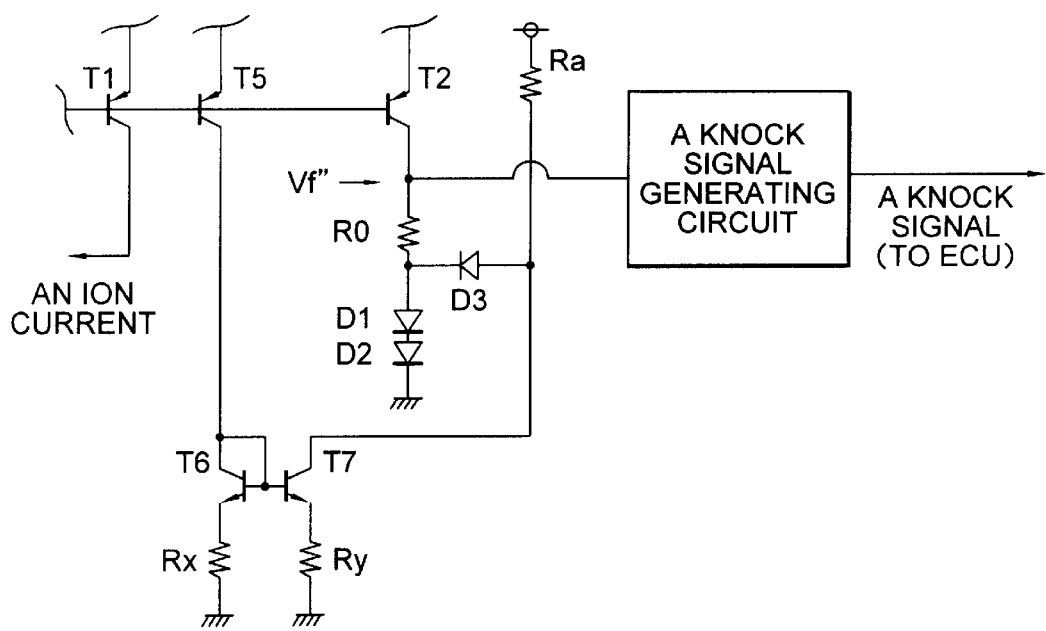
FIG. 2 is a block diagram of an ion current-to-voltage conversion circuit according to an embodiment of the present invention.

An embodiment of the present invention is shown in FIGS. 1 and 2.

FIG. 1 is a schematic block diagram of an ion current detector according to the present invention. In the drawing, an ignition coil 1 is shown. This ignition coil 1 has a primary winding 1a and a secondary winding 1b, to which a direct-current high voltage VB has been applied. The conduction/cutoff control of a primary current flowing through the primary winding 1a is conducted by a power transistor 2. When the primary current is cut off, a high voltage is generated at one end of the secondary winding 1b. Due to this high voltage, a spark discharges between the electrodes of an ignition plug 5, which is connected to one end of the secondary winding so mixed gas inside a cylinder combustion chamber of an engine, not shown in the drawing, gets fired.

To the other end of the secondary winding 1b, a parallel circuit comprising a resistor 3 for current limitation and a diode 4 configuring a secondary current charging route is connected. The other end of the secondary winding 1b is connected to a bias power circuit 26 via the parallel circuit.

The bias power circuit 26 comprises a capacitor for a bias power supply (hereinafter referred to as the capacitor) 6, a Zener diode for a bias voltage clamp (hereinafter referred to as the Zener diode) 7 having been connected to the capacitor 6 in parallel, and a diode 8 with an anode having been connected to an anode of the Zener diode 7 and with a cathode having been connected to ground, thus structuring a secondary current charging route. The secondary current will produce an electric charge in the capacitor 6 through the diode 4, the capacitor 6, and the diode 8.

Numeral 21 is a Current Mirror circuit to detect an ion current. Current Mirror circuit 21 comprises transistors T1, T2, and T3 with emitters commonly connected through respective resistances to an output terminal of an integrated circuit mentioned below and with bases mutually connected, and a transistor T4 with an emitter connected to the bases of the transistors T1, T2 and T3. The base of T4 is connected to a collector of transistor T1 and also to a connection point P between capacitor 6 of the bias power circuit 26 and diode 8. The collector of T4 is connected to ground.

The collector of transistor T2 is connected to an input terminal of an ion current-to-voltage conversion circuit 24, mentioned below, and the collector of the transistor T3 is connected to an input terminal of another ion current-to-voltage conversion circuit 22, also mentioned below.

Numeral 27 is an integrated circuit utilizing an operational amplifier. This integrated circuit 27 conducts feedback control on the voltage of the connection point P between Zener diode 7 and diode 8 to zero volts. The integrated circuit 27 also converts the electric potential, which can be negative at point P, to a positive potential applied to the common connection point of the resistance.

Numeral 22 is an ion current-to-voltage conversion circuit for voltage-converting an ion current flowing through transistor T3 to output ion signals. Numeral 23 is a combustion/misfire signal generating circuit for generating signals used in determining combustion/misfire from ion signals that have been output from the ion current-to-voltage conversion circuit 22. Numeral 24 is an ion current-to-voltage conversion circuit for voltage-converting the ion current flowing through transistor T2 in the Current Mirror circuit 21. Numeral 25 is a knock detection signal generating circuit operable to extract and amplify an oscillating component of signals resembling knock from ion signals having been outputted from the ion current-to-voltage conversion circuit 24. For outputting, an ECU 28 (engine control unit) is provided. ECU 28 receives signals from the combustion/misfire signal generating circuit 23 and the knock detection signal generating circuit 25 and calculates ion signal recognition and the ignition timing control in accordance with misfire detection and the occurrence rate of the knocking from a cylinder, not shown.

Next, the performance of an ion current detector according to the present invention will be explained on the basis of the above-described configuration. The power transistor 2 performs conduction/cutoff of the primary current flowing in the primary winding 1a of the ignition coil 1 to step up the secondary voltage, thus, generating a high secondary voltage (several tens kV) for ignition from the secondary winding 1b of the ignition coil 1. By way of this high voltage, a spark is produced at the ignition plug 5 so mixed gas inside a cylinder of an engine, not shown, is fired and burned. If combustion is normal, ions are generated in accordance with the combustion around the ignition plug 5 and inside the cylinder just after ignition.

When a spark discharge takes place at the ignition plug 5 due to a high voltage generated at the secondary winding 1b, a secondary current flows to the bias circuit 26 through the charging route comprising diode 4. The capacitor 6 is charged by the secondary current in the bias circuit 26, and a bias voltage (around several hundred volts) is generated in the capacitor 6 by a clamping voltage of the Zener diode 7.

Upon completion of a discharge at the ignition plug 5, when the bias voltage having been charged in the capacitor 6 is biased to the ignition plug 5, and an ion current has flowed due to the bias voltage, an electric potential at the connection point P becomes negative, and is input to an inverting input terminal of an operational amplifier so a positive output is applied to emitter resistance from an output terminal of the operational amplifier. When the transistor T4 starts an ON-state operation, the transistors T2 and T3 comprising a Current Mirror circuit as well as the transistor T1 start ON-state operations. The ion current flows through a loop comprising a positive potential related to emitter resistance, the emitter resistance, the transistor T1, the capacitor 6, the resistance 3, the secondary winding 1b, the ignition plug 5, and ground.

The transistor T1 generates a reference current for the Current Mirror circuit 21. When an ion current flows through the transistor T1 a similar ion current flows to the transistors T2 and T3. Thus, a current equivalent or similar to the ion current is input to the ion current-to-voltage conversion circuit 22 for detecting combustion/misfire signals and to the ion current-to-voltage conversion circuit 24 for detecting knock signals.

The ion current-to-voltage conversion circuits 22 and 24 transform an ion current to a voltage to generate an ion signal for outputting to the combustion/misfire signal generating circuit 23 and a knock signal generating circuit 25, respectively.

A determination signal to determine a combustion/misfire based on the inputted ion signal is generated by the combustion/misfire signal generating circuit 23 and is inputted to the ECU 28. In addition, a signal representative of the knock is extracted and amplified from an ion signal by the knock signal generating circuit 25 and is input to the ECU 28. The ECU 28 processes the input signals and conducts ignition timing control in accordance with misfire detection and the occurrence rate of the knocking.

FIG. 2 shows an example of an ion current-to-voltage conversion circuit for the abovedescribed knock detection.

Transistors T1 and T2 are identical to those described in FIG. 1, with a current identical to the ion current being inputted from the transistor T2. Though not shown in FIG. 1, the current identical to the ion current flows from a transistor T5 with the bases and emitters of the transistors T1 and T2, respectively, being commonly connected, thus configuring a Current Mirror circuit.

As a configuration of the ion current-to-voltage conversion circuit 24, resistance Ro as well as diodes D1 and D2 are connected in series between an input terminal, to which a collector of the transistor T2 is connected, and ground. A diode D3 is forward-connected between a connection point between resistance Ro and diode D1 and a direct-current power supply Vcc via resistance Ra.

Moreover, built in the ion current-to-voltage conversion circuit 24 is a Current Mirror circuit configured by transistors T6 and T7, wherein emitters of transistors T6 and T7 are respectively connected to ground via a resistance, and the collector and the base of transistor T6 are connected to the base of transistor T7. In addition, the collector of transistor T6 is connected to the input terminal to which the collector of transistor T5 is connected while a collector of transistor T7 is connected to the anode of diode D3.

Next, the operation of the present invention will be explained further.

An ion current Io flowing through transistor T2 is converted to a voltage (Vf), having summed a voltage drop in Ro and the anode voltages in the diodes D1 and D2. Voltage, Vf, is described in equation (1) as indicated below. When the ion current is given as Io, a current, Ia, flows through D3 (Ia hereinafter referred to as idle current):

$$Vf=2*\{k*T*\ln(Io+Ia)\}/e+Ro*Io \quad (1)$$

wherein, k: Boltzman's coefficient, e: elementary charge, T: absolute temperature.

Thus, with a variation quantity of an ion current due to knocking being given as ΔI, the output voltage range Vf" of a voltage Vf is described in equation (2) as indicated below:

$$Vf''=[2*\{k*T*\ln(Io+Ia+\Delta I)\}/e+Ro*(Io+\Delta I)]-[2*\{k*T*\ln(Io+Ia)\}/e+Ro*Io]$$

$$Vf''=-2*\{k*T*\ln(Io+Ia)/(Io+Ia+\Delta I)\}/e+Ro*\Delta I \quad (2)$$

However, when (Vcc−3VF)/Ra−Io*Rx/Ry>0 is given,

Ia=(Vcc−3VF)/Ra−Io*Rx/Ry and when (Vcc−3VF)/Ra−Io*Rx/Ry=<0 is given,

Ia=0.

Figure 3:
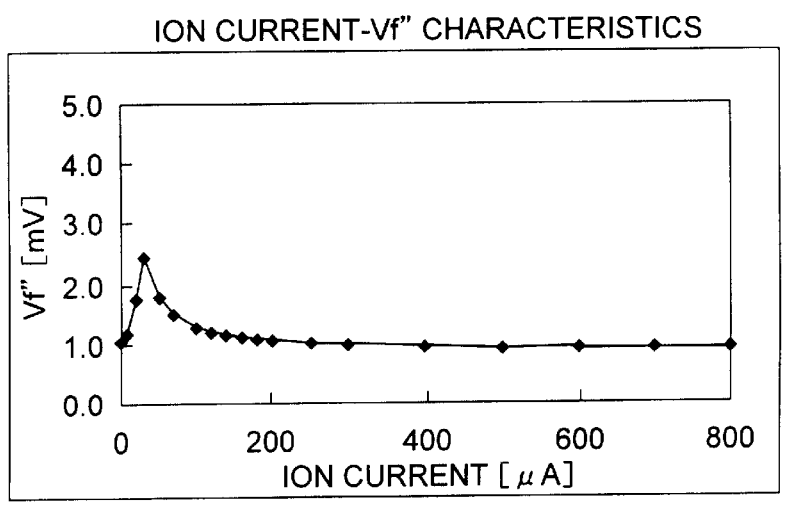
FIG. 3 is an ion current-Vf" characteristic graph showing the relationship between the ion current and the converted voltage Vf" in an ion current-to-voltage conversion circuit according to an embodiment of the invention.

With Vcc=5V, ΔI=1 μA, Ro=750 Ω, Ra=180 kΩ, Rx=1.5 kΩ, Ry=200 Ω, the graph of a relationship between the ion current quantity and the output voltage fluctuation with Vf" is shown in FIG. 3.

By adjusting Ro, the voltage conversion ratio of the ion current's variation quantity ΔI due to knocking is determined.

When the ion current Io flows through the transistors T6 and T7, configuring a Current Mirror circuit, the ion current Io flows through the transistor T6 and the idle current Ia flows through the transistor T7. At that time, by adjusting the ratio of resistance Rx as well as Ry, the idle current may be made adjustable in accordance with a predetermined ion current quantity. As a result, the voltage conversion ratio of an ion current in the region with a large ion current can be made lower.

By adjusting the idle current (a change to a greater current), an increase in the voltage conversion ratio of the variation quantity ΔI of the ion current in the region with a low ion current, which caused problems in the conventional ion current-to-voltage conversion part, can be made lower.

Embodiment 2

Figure 4:
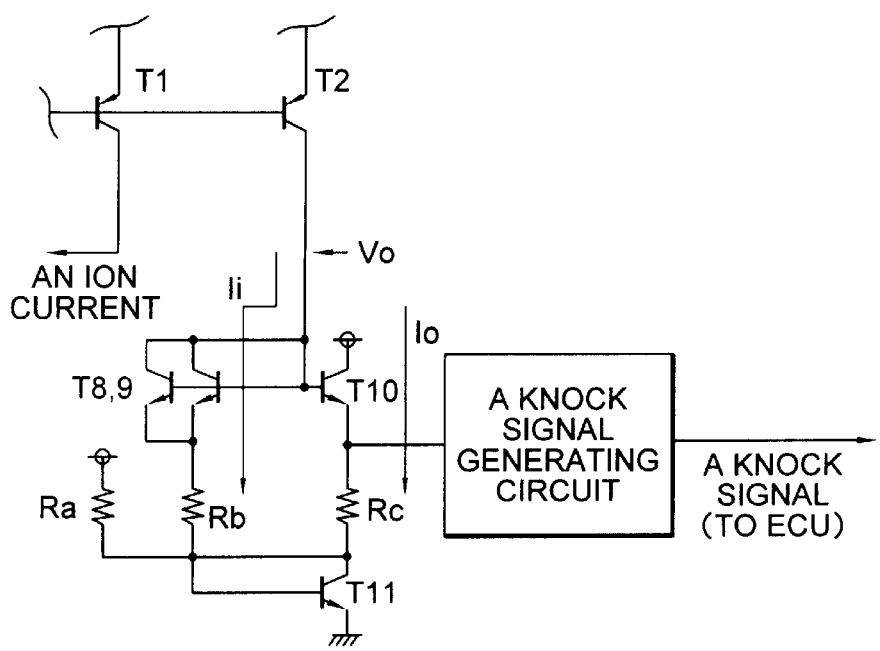
FIG. 4 is a block diagram of an ion current-to-voltage conversion circuit according to another embodiment of the present invention.

Another example of the ion current-to-voltage conversion circuit 24 for detecting a knock is shown in FIG. 4. Transistors T1 as well as T3, not shown, are identical to those described in FIG. 1, with a current identical to the ion current being inputted from the transistor T2 to the ion current-to-voltage conversion circuit.

As a structure of an ion current-to-voltage conversion circuit related to the present embodiment, it is configured to comprise transistors T8 and T9 with their collectors having been commonly connected to the collector of transistor T2. Further, their respective bases and emitters are connected together as well. The circuit further comprises a transistor T10 with a direct-current voltage Vcc having been applied to its collector, with its base having been connected to the bases and collectors of transistors T5 and T9, and with its emitter having been connected to ground via a resistance Rc and a transistor T11.

Incidentally, the emitters of transistors T8 and T9 configuring a Current Mirror circuit and an emitter of the transistor T10 are connected to resistance Rb and to a resistance Rc, respectively, and thereafter commonly to a base as well as a collector of the transistor 11. The direct-current voltage Vcc is applied to this common connection point via resistance Ra. By a voltage drop due to the resistance Rc, an ion current is inputted to a knock signal generating circuit 25.

Next, the operation of the present embodiment will be explained in accordance with the above-described configuration. A current flowing through the transistors T8 and T9 is given as Ii (being equal to the ion current) and a current flowing through the transistor 10 as Io. The current Io is an ion current representing the portion subject to actual voltage conversion in the ion current having flowed in from the transistor T2. In addition, the transistor T11 is used to shift a level of the direct-current voltage converted for the purpose of transferring the oscillation occurring at both the positive and negative sides in the knocking vibration to a knock signal generating circuit 25 at the post stage. An idle current, substantial enough to hold the direct-current voltage level fixed when disregarding the ion current quantity, is supplied to the base of the transistor T11 via resistance Ra from a direct-current power VB. As a result, a base-emitter voltage VBE of the transistor 11 is generated. Due to this emitter-base voltage VBE, the direct-current voltage level of input signals to the knock signal generating circuit 25 is shifted.

As for the Vo generated by the ion current Ii as well as an idle current flowing, the following equation (A) is established:

$$Vo=Rb*Ii+VBE(T8, T9)+VBE(T11)$$

$$10=Rc*Io+VBE(T10)+VBE(T11) \quad (A)$$

A ratio between Io and Ii is obtained from equation (A) under Rb=Rc=R, resulting in the following (B):

$$Io/Ii=1+(VBE(T8, T9)-VBE(T10))/Ii*R$$

$$=1+((kT/q)Ln(Is(T10)*Ii/Is(T8)*Io))/(Ii*R) \quad (B)$$

Here, in case of Io/Ii=0.9 (where 90% of the ion current Ii having flowed in flows through the transistor T10), a normal conversion ratio of the ion current-to-voltage conversion circuit 24 becomes as follows:

With R=Rc=Rb=1[kΩ] being given, and substituted in the equation (B), $$0.9=1+(26[mV]*Ln(0.5*1.11)/(Ii*1[k\Omega])$$

$$15.3[mV]/(Ii*1[k\Omega])=0.1$$

$$Ii=15.3[mV]/0.1*1[k\Omega]=153[\mu A]$$

As a result of the above, a current Io, being a portion subject to a voltage conversion flowing through the transistor T11 under the ion current Ii having flowed being 153 [μA], becomes 90% of the ion current Ii. The current Io is subject to a voltage conversion at Rc, and transferred to the knock signal generating circuit (25) at the post stage.

In addition, with Io/Ii=0.6 (thereunder a 60% current of an ion current Ii flows through the transistor T10) being given, Ii is obtained likewise.

$$Ii=4.74[mV]/0.4*1[k\Omega]=11.8[\mu A]$$

is obtained, and a current Io being a portion subject to a voltage conversion to flow through the transistor T11 under the ion current Ii being 11.8[μA] becomes 60% of the ion current Ii. As a result of the above, the normal conversion ratio of the ion current-to-voltage conversion circuit 24 in a region with a lower ion current can be made to decrease.

For a region with a large ion current not less than the above-described 153[μA], since Io nearly equivalent to the ion current Ii can be made to flow, a normal conversion ratio of the ion current-to-voltage conversion circuit 24 in a region with a large ion current becomes substantially fixed.

Figure 5:
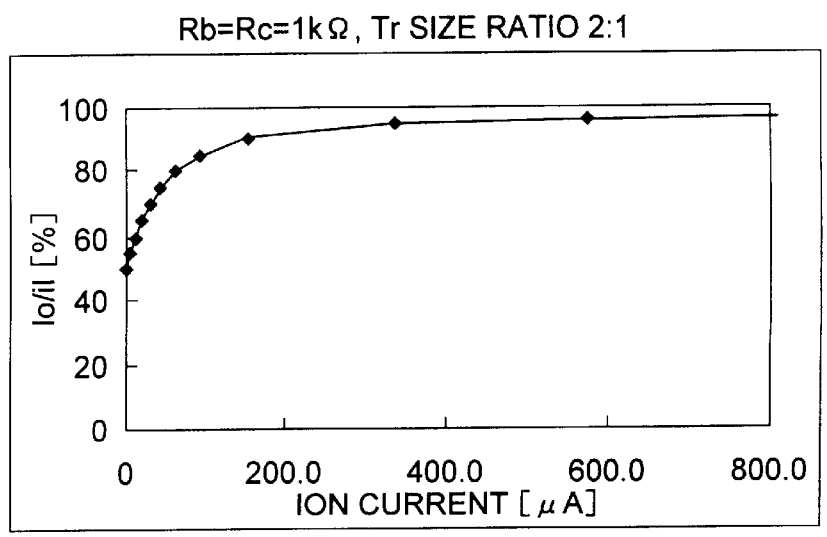
FIG. 5 is a graph showing the relationship between the ion current and the voltage conversion ratio on the ion current.

As mentioned above, a graph of the relationship between the ion current quantity and the Io under Rb=Rc=1[kΩ] being given and a size ratio of the transistors (T8 and T9: T10) being given as 2:1 is shown in FIG. 5.

Figure 6:
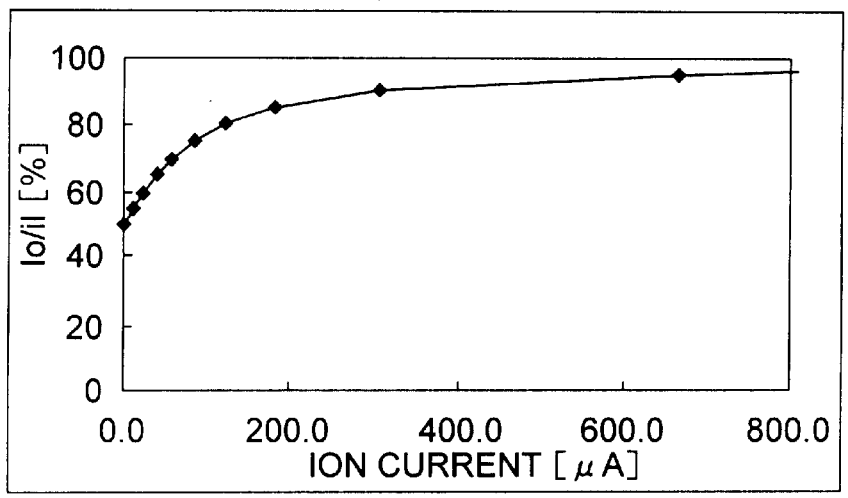
FIG. 6 is a graph showing the relationship between the ion current and the voltage conversion ratio on the ion current.

In addition, a graph of the relationship between the ion current quantity and the Io under the size ratio of the transistors being kept as 2:1 and under R=Rc=Rb=2[kΩ] being given is shown in FIG. 6. The ion current quantity where Io is 90% of the ion current is 76.5[μA], and the ion current quantity where Io is 60% of the ion current is likewise calculated to yield 5.9[μA].

Figure 7:
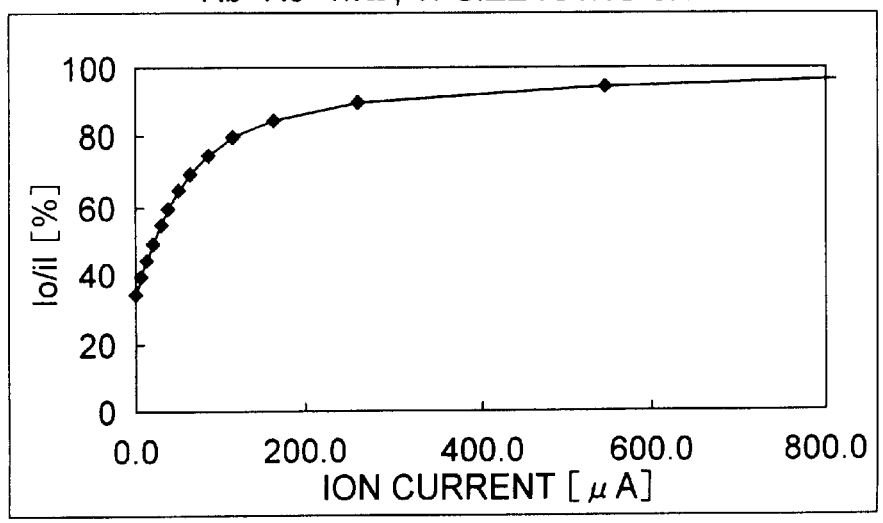
FIG. 7 is a graph showing the relationship between the ion current and the voltage conversion ratio on the ion current.

Incidentally, there is shown in FIG. 7 a graph of the relationship between the ion current quantity and Io where an additional transistor Tx (not shown) has been connected in parallel with T8 and T9, having the transistor ratio of 3:1, and Rb=Rc=1[kΩ] is given. The ion current quantity when Io takes 90% of the ion current Ii is 258[μA] while the ion current quantity when Io takes 60% of the ion current Ii is likewise calculated to yield 25.5[μA].

As mentioned above, the current region as well as a reduction degree to reduce the ion current-to-voltage conversion ratio can be set with the size ratio of the transistor as well as values of resistance Rc and Rb.

As a result, while holding the conversion ratio of the ion current Ii in a region with a large ion current nearly fixed, the conversion ratio of the ion current Ii in a region with lower ion current can be made lower.

Embodiment 3

Figure 8:
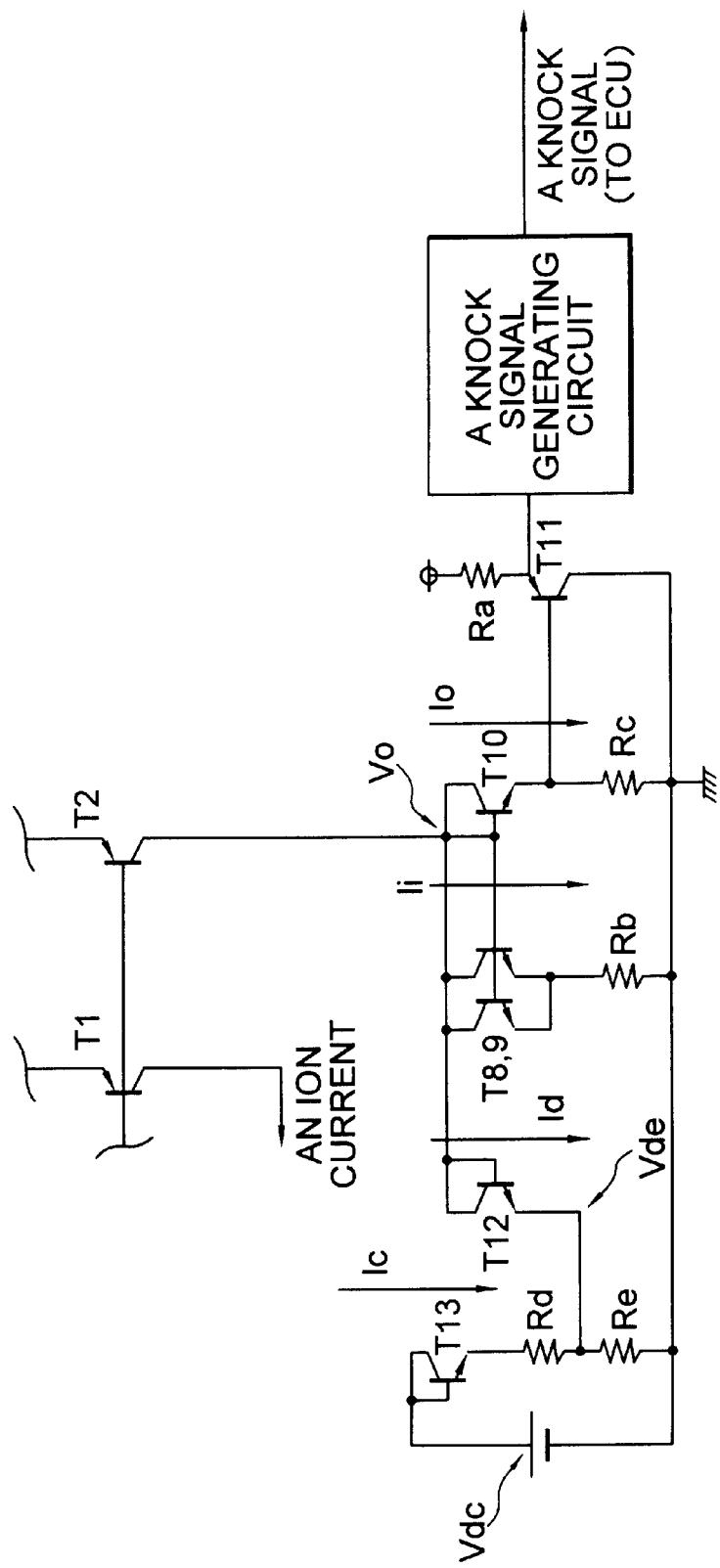
FIG. 8 is a block diagram of an ion current-to-voltage conversion circuit according to yet another embodiment of the present invention.

Another example of the ion current-to-voltage conversion circuit 24 for detecting a knock is shown in FIG. 8.

Incidentally, in the drawing, the same symbols as those in FIG. 4 represent the same or corresponding parts. In the present embodiment, a collector of transistor T10 is connected to the collectors of transistors T8 and T9 configuring a Current Mirror circuit, and an emitter of T10 is connected to ground via a resistance Rc.

When a current Io flows through transistor T10 into the resistance Rc, a voltage drop occurs at both ends of the resistance Rc to conduct a voltage conversion. An output from this voltage subject to a voltage conversion is inputted to the knock signal generating circuit 25 subject to a level shift with a base-emitter voltage VBE of a transistor T11 with a base and a collector of a transistor T11 being connected to both ends of the resistance Rc. Emitters of the transistor T8 and T9 are commonly connected to ground via a resistance Rb.

A base and a collector of the transistor T12 is connected to the collectors of the transistors T8 and T9 and an emitter of the transistor T12 is connected to a connection point between resistance Rd and Re in a series circuit comprising a transistor T13, the resistance Rd and Re connected in parallel with a direct-current power supply voltage Vdc, and thus a voltage drop of Vde due to resistance Re is applied to the emitter of transistor T12.

Next, the operation of the present embodiment will be explained. In the same way as in embodiment 2, the ratio of Io and Ii in a lower ion current region is attainable with the aforementioned equation (B).

In regard to the relationship between the ion current Ii and Io in the higher ion current region, the below-described equation is established with an electric potential at a connection point between resistance Rd and Re being given as Vde, the direct-current power supply voltage as Vdc, a current flowing through the transistor T10 as Io, a current flowing through the transistors T8 and T9 as Ii, a current flowing through the transistor T12 as Id, and a current flowing through the transistor T13 as Ic:

Vo=Io*Rc+VBE(T10)=Ii*Rb+VBE(T8, T9)=Vde+VBE(T12) is obtained.

Here, when Vdc=1.25[V], VBE(T8, T9)=VBE(T10)=VBE(T12)=VBE(T13)=$V_F$=0.7[V], Rd=400[Ω], Re=700[Ω], and Rb=Rc=4[kΩ] is given, the above equation is expressed as the following equation (10).

$$Vo = I*4[k\Omega] + V_F Vde + V_F \tag{10}$$

Although Ic=(Vdc−VBE(T13)−Vde)/Rd is to be obtained, the following equation (11) is obtainable from the above-described conditions:

$$Ic = (Vdc - V_F - Vde)/4000[\Omega] \tag{11}$$

Although Vde=(Ic+Id)*Re is to be obtained, the following equation (12) is attainable from the above-described conditions:

$$Vde = (Ic+Id)*700[\Omega] \tag{12}$$

Next, the relationship between an ion current Ii and Io is obtained under Ii=Io=I being given:

$$Ii = 2*I + Id \tag{13}$$

Next, Id is obtained from the above-described equations (10) through (12).

First, Vde is obtained as in the following equation (14) from the equations (10) and (12):

$$Vde = 700\ Ic - 700\ Id = 4000\ I \tag{14}$$

Next, the Ic is obtained from the equations (11) and (12):

$$Ic = (Vdc - V_F - 700\ Ic - 700\ Id)/400$$

$$Ic = (0.55/400) - (700/400)Ic - (700/400)Id$$

$$Ic = (0.55/1100) - (700/1100)Id \tag{15}$$

Here, Id is obtained from the equations (14) and (15).

$$(700/1100)(0.55 - 700\ Id) + 700\ Id = 4000\ I$$

Thus, Id=15.7 I−1375[μA] is obtained.

With Id=0 being given, I=87.58[μA] is obtained. From the above-described equation (13), Ii=2 I=175.2[μA] is obtained.

Based on the above description, when an ion current of not less than 175.2[μA] flows into the ion current-voltage conversion circuit 24 from the transistor T2, Id flows through the transistor T12 so that the ratio of Io toward the Ii decreases.

Next, described is a voltage conversion ratio for knocking vibration in a region with a large ion current when the ion current Ii is around 1000[μA].

Ion current Io is given as an ion current representing the portion subject to voltage conversion in the ion current Ii having flowed, that is, Io is given as an input current Iin to the ion current-voltage converter 24.

Ii can be expressed by the following equation using Id=15.7 I−1375[μA] as well as Ii=2*I+Id.

$$Ii = 2 \times I + 15.7 \times I - 1375[\mu A]$$

$$= 17.7\ I - 1375[\mu A]$$

With Ii=1000[μA] being given, Iin (=I) becomes 134.2[μA] from the relationship of 17.7 I=2375[A].

At this time, Id becomes 731.6[μA].

From the above description, it is also possible to decrease the current-to-voltage conversion ratio in the region with a large ion current since the ion current of 13.42% is converted into a voltage for the generated ion current of 1000[A].

In addition, by setting constants, it is also possible to set a current region which lowers the current-to-voltage conversion ratio.

What is claimed:

1. An ion current detector for detecting an ion current generated around an ignition plug just after mixed gas inside a cylinder is ignited with a spark at the ignition plug due to a voltage generated by an ignition coil, said detector comprising:

a voltage generating circuit operable to generate a high voltage applied to the ignition plug via the ignition coil;

an ion current-to-voltage conversion circuit operable to convert an ion current that flows between electrodes of the ignition plug into a voltage said voltage output as an ion signal; and a signal processing circuit operable to process the ion signals, wherein the ion current-to-voltage conversion circuit utilizes a voltage conversion ratio of the ion current that is smaller in a region where the magnitude of the ion current is relatively low as compared to other areas.

2. The ion current detector according to claim 1 wherein the voltage conversion ratio of the ion current is fixed when the magnitude of the ion current is not less than a predetermined value.

3. The ion current detector according to claim 1 wherein the voltage conversion ratio of the ion current decreases in proportion to the magnitude of the ion current when the magnitude of the ion current is not more than a predetermined value.

4. The ion current detector according to claim 1 wherein the voltage conversion ratio of the ion current decreases as the magnitude of the ion current increases in a region of a voltage versus current curve where the magnitude of the ion current is very large, and the voltage conversion ratio of the ion current decreases as the magnitude of the ion current in a region of said curve where the magnitude of the ion current is small.

5. The ion current detector according to claim 4 wherein the voltage conversion ratio of the ion current decreases as the magnitude of the ion current gets larger in a region of the curve where the magnitude of the ion current is not less than a first predetermined value, and wherein further, the voltage conversion ratio of the ion current decreases as the magnitude of the ion current diminishes in a region of the curve where the magnitude of the ion current is not more than a second predetermined value, and wherein further, the voltage conversion ratio of the ion current is fixed when the magnitude of the ion current is not less than the second predetermined value and not more than the first predetermined value.

6. An ion current detector for detecting an ion current in a combustion engine, said detector comprising:

a voltage generator operable to generate a large voltage between electrodes of an ignition plug;

a bias circuit operable to receive a secondary current generated around said ignition plug subsequent to a spark being generated at said ignition plug, and further operable to generate a bias voltage based on said secondary current and operable to generate an ion current based on said bias voltage;

a current mirror circuit operable to receive said ion current and further operable to generate a plurality of mirror currents based on said ion current; and a current-to-voltage converter operable to convert one of said mirror currents to a voltage in accordance with a voltage conversion ratio, and further operable to output an ion signal based on said voltage.

7. An ion current detector as claimed in claim 6 wherein said voltage conversion ratio varies in accordance with a magnitude of said ion current.

8. An ion current detector as claimed in claim 6 wherein said voltage conversion ratio is fixed when said ion current is greater than or equal to a predetermined value and said voltage conversion ratio is variable when said ion current is less than said predetermined value.

9. An ion current detector as claimed in claim 6 wherein said voltage conversion ratio decreases in proportion to said ion current when said ion current is greater than or equal to a predetermined value.

10. An ion current detector as claimed in claim 6 wherein said voltage conversion ratio decreases as the ion current increases and is relatively large in magnitude, and said voltage conversion ratio also decreases as the ion current decreases and is relatively low in magnitude.

11. An ion current detector as claimed in claim 6 wherein said voltage conversion ratio decreases as the ion current increases and is greater than or equal to a first predetermined value, and said voltage conversion ratio also decreases as the ion current decreases and is less than or equal to a second predetermined value, and said voltage conversion ratio is fixed when said ion current is between said first and second predetermined values.

12. An ion current detector as claimed in claim 6 wherein said current-to-voltage converter comprises a second current mirror circuit.

13. An ion current detector as claimed in claim 6 further comprising a knock-signal generating circuit operable to receive said ion signal and extract and amplify an oscillating component, wherein said oscillating component is indicative of an amount of knock that exists in the engine.

14. An ion current detector as claimed in claim 6 further comprising a misfire-signal generating circuit operable to receive said ion signal and extract and amplify an oscillating component, wherein said oscillating component is indicative of a misfire condition in the engine.

* * * * *